United States Patent [19]

Suzuki

[11] Patent Number: 5,750,985
[45] Date of Patent: May 12, 1998

[54] HIGH SPEED AND HIGH PRECISIOIN IMAGE SCANNING APPARATUS

[75] Inventor: Kenji Suzuki, Kawasaki, Japan

[73] Assignee: Canon Kabushiki Kaisha, Tokyo, Japan

[21] Appl. No.: 684,963

[22] Filed: Jul. 19, 1996

[30] Foreign Application Priority Data

Jul. 24, 1995 [JP] Japan .................. 7-187193

[51] Int. Cl.⁶ .................................. H01J 40/14
[52] U.S. Cl. .................. 250/234; 250/226; 358/496
[58] Field of Search .................. 250/234, 208.1, 250/226; 358/496

[56] References Cited

U.S. PATENT DOCUMENTS

| | | | |
|---|---|---|---|
| 4,234,789 | 11/1980 | Fournet | 250/234 |
| 4,676,623 | 6/1987 | Akashi et al. | 354/408 |
| 4,800,258 | 1/1989 | Suzuki et al. | 235/479 |
| 5,182,658 | 1/1993 | Ishizaki et al. | 358/483 |
| 5,426,290 | 6/1995 | Kawomoto | 250/226 |

*Primary Examiner*—Edward P. Westin
*Assistant Examiner*—Kevin Pyo
*Attorney, Agent, or Firm*—Fitzpatrick, Cella, Harper & Scinto

[57] ABSTRACT

The invention is to realize an image scanning apparatus capable of achieving both high precision and high-speed scanning properties while maintaining and pursuing size and cost reductions of the apparatus. For this purpose, an image scanning apparatus having an imaging optical system for forming at least part of imaging light of an object into an image, an image sensor for performing photoelectric conversion of an optical image formed by the imaging optical system, and a moving unit for moving the optical image and the image sensor relative to each other, wherein the image sensor includes a plurality of photoelectric conversion units arranged adjacent to each other, a charge transfer unit for transferring charges generated by the plurality of photoelectric conversion units, and a charge adding unit for adding the charges transferred by the charge transfer unit, is disclosed. The image scanning apparatus includes a control unit for performing control such that the charge transfer unit transfers the charges substantially in synchronism with optical image movement by the moving unit, and the charge adding unit adds the charges from different photoelectric conversion units in accordance with a transfer operation of the charge transfer unit.

19 Claims, 13 Drawing Sheets

HIGH SPEED AND HIGH PRECISIOIN IMAGE SCANNING APPARATUS

BACKGROUND OF THE INVENTION

1. Field of the Invention

The present invention relates to an image scanning apparatus, i.e., an image scanner serving as an image read apparatus for photoelectrically scanning the image of an object recorded on a medium such as a paper sheet or a film and converting the image into electrical information.

2. Related Background Art

Conventionally, various image scanners for photoelectrically scanning an image and converting the image into electrical information have been proposed and put into practice. Excluding those which illuminate and scan an original with a focused light beam such as a laser beam and measure the amount of reflected or transmitted light, image scanners using image sensors will be briefly described below in connection with their techniques and problems.

A prior art is shown in FIGS. 23A and 23B. FIG. 23A is a perspective view of the entire arrangement of an image scanning apparatus, and FIG. 23B is a view showing an image sensor portion. Referring to FIGS. 23A and 23B, only a small elongated area 221R parallel to a long side direction 227b of an original 221 as an object is illuminated with a tubular light source 222. A white fluorescent lamp or a xenon lamp is normally used as the light source 222. A reflecting mirror 223 or the like is often placed on the rear side of the light source 222 to improve the utilization efficiency of illumination light or to prevent unnecessary light from scattering into the equipment. Light reflected from the small illuminated area 221R is formed into a reduced image on the photoelectric conversion surface of an image sensor 225 by an imaging lens 224. Generally, the image sensor 225 is made as small as possible in the production process to decrease the production cost and designed to have a small chip size. Since the image sensor 225 is often much smaller than an original, a reduced image is formed.

The image sensor 225 comprises three line image sensors. For the respective lines, R, G, and B color filters are stacked on the photosensitive portions of photoelectric conversion elements. Three line sensors 225a, 225b, and 225c with different spectral sensitivity characteristics (normally with an RGB arrangement) are arranged adjacent to each other at a pitch A, thereby constituting one image sensor 225. The original 221 is sequentially mechanically fed in a direction indicated by an arrow 227a. The image sensor 225 electrically scans the original at the present position along the main scanning direction, i.e., a direction indicated by the arrow 227b perpendicular to the arrow 227a. Upon completion of the scanning operation, the original is fed along the subscanning direction indicated by the arrow 227a by one pitch. This operation is repeated until the original ends.

The three line sensors 225a, 225b, and 225c detect different positions of the original, which are separated at the distance A between adjacent lines. When the original is mechanically fed along the direction 227a, the same position can be sampled at different points of time. Therefore, no problem is posed as far as a data processing circuit 226 (to be described later) is designed in consideration of this point.

The processing circuit 226 includes an amplifier, an A/D converter, a memory, a timing generation circuit, and the like. Some scanners of this type scan a transparent original such as a developed photographic film in addition to the reflecting original shown in FIG. 23A. For a transparent original, the light source and the sensor are arranged on opposite sides with respect to the original, though no other significant difference is present.

Some color scanners have a different arrangement in which light sources of three colors of R, G, and B sequentially emit light of the respective colors, and photoelectric conversion is performed by a monochromatic line image sensor. In this case, the sensor can have a simple one-line structure. However, since different accumulation periods are sequentially required for the three colors, the time required to scan the entire frame becomes three times longer.

The basic problem of the image scanning apparatus of this type is that a long time is required to completely scan one frame. To scan a highly precise image, generally, a resolving power of several thousand pixels is required along the directions 227a and 227b. Photocharges are simultaneously accumulated in pixels on the line sensors, which are electrically scanned along the direction 227b. Therefore, when the speed of an electrical operation in output is increased, the operation time can be shortened. However, along the mechanical feeding direction indicated by the arrow 227a, the image sensor must output photocharges at the immediately preceding position and newly accumulate photocharges every time the original is fed by one pitch. The time required to accumulate photocharges is a physical quantity determined by optical parameters including the density of the original, the brightness of the light source or the imaging optical system, and the sensitivity of the sensor and cannot be coped with by only increasing the operation speed of the circuit. In many cases, a transparent original such as a negative film has an average density higher than that of a reflecting original, so that the time required to scan the original tends to be further prolonged.

One method of shortening the time required for accumulation in the image sensor is to increase the light intensity of the light source. When the light source is bright, the accumulation time is shortened in reverse proportion to the intensity of the light source. However, an increase in intensity of the light source makes the apparatus bulky or causes an increase in heat generation amount and cost, so this solution is not so preferable for some application purposes of the scanner. As another method, the main scanning direction can be set along the long sides of the original, as in FIGS. 23A and 23B where the sub-scanning direction is set along the short sides of the original. With this arrangement, the number of necessary pixels of the image sensor slightly increases. However, the number of subscanning cycles can be decreased, so that the number of mechanical operations can be decreased. A lot of general scanners in practice are actually designed with such an arrangement, though the scanning time is not sufficiently shortened.

When an area image sensor which covers the optical image of the entire original surface is used, the entire frame can be simultaneously photoelectrically converted. However, to scan a highly precise image, a resolving power of several ten million or more pixels is required. When this resolving power is to be realized with CCD image pickup elements, the cost largely increases to an impractical degree.

SUMMARY OF THE INVENTION

It is an object of the present invention to provide an image scanning apparatus capable of performing an image scanning operation with a high precision.

In order to achieve the above object, according to an aspect of the present invention, there is provided an image scanning apparatus having an imaging optical system for forming at least part of imaging light of an object into an image, an image sensor for performing photoelectric conversion of an optical image formed by the imaging optical system, and moving means for moving the optical image and the image sensor relative to each other, wherein the image sensor comprises a plurality of photoelectric conversion means arranged adjacent to each other, charge transfer means for transferring charges generated by the plurality of photoelectric conversion means, and charge adding means for adding the charges transferred by the charge transfer means, and the image scanning apparatus further comprises control means for performing control such that the charge transfer means transfers the charges substantially in synchronism with optical image movement by the moving means, and the charge adding means adds the charges from the plurality of different photoelectric conversion means in accordance with a transfer operation of the charge transfer means. With this arrangement, image information can be output with a series of synchronous operations of the moving means, the transfer means, and the like. In addition, highly precise scanning of an object image can be realized at a high speed, and an image signal of a high level can be obtained. Furthermore, a compact and inexpensive apparatus can be constituted.

In the above image scanning apparatus, the plurality of photoelectric conversion means constituting the image sensor comprise first photoelectric conversion means having at least a first color filter on a photosensitive surface, and second photoelectric conversion means having a second color filter of a color different from that of the first color filter. The photoelectric conversion means comprise a plurality of first photoelectric conversion means and a plurality of second photoelectric conversion means, and the charge adding means adds charges generated by the plurality of first photoelectric conversion means and adds charges generated by the plurality of second photoelectric conversion means. The image sensor has a light-shielded transfer cell array along a direction perpendicular to a direction of charge transfer of the charge transfer means. The object is moved when signal charges accumulated in the image sensor are present in the light-shielded transfer cell array. A charge adding operation and a photoelectric conversion operation are performed in the same area of the image sensor.

The image scanning apparatus further comprises detection means for detecting relative movement of the optical image and the image sensor by the moving means, and wherein the control means performs relative control of optical image movement and charge transfer on the basis of an output from the detection means. The apparatus further comprises imaging means arranged on a sensor surface of the image sensor and serving as a common refracting element for a plurality of pixels. The charge transfer means performs charge transfer operations a plurality of number of times within a short period of time in which photoelectric conversion of signal charges is substantially not performed.

According to another aspect of the present invention, there is provided an image scanning apparatus having an imaging optical system for forming at least part of imaging light of an object into an image, an image sensor for performing photoelectric conversion of an optical image formed by the imaging optical system, and moving means for moving the optical image and the image sensor relative to each other, wherein the image sensor comprises a plurality of photoelectric conversion portions each constituted by a set of a plurality of photoelectric conversion means having color filters of different colors and light-shielded transfer cells which are the same in number as the photoelectric conversion means and arranged alternately with the photoelectric conversion means, charge transfer means for transferring charges generated by the photoelectric conversion means, and charge adding means for adding the charges transferred by the charge transfer means, and the image scanning apparatus further comprises control means for performing control such that the charge transfer means transfers the charges substantially in synchronism with optical image movement by the moving means, and the charge adding means adds the charges from the plurality of different photoelectric conversion means in accordance with a transfer operation of the charge transfer means. With this arrangement, the color image of the object is read to output a color image information signal with a series of synchronous operations of the moving means, the transfer means, and the like. With this operation, scanning of an object image can be realized with a precision higher than that for a monochrome image at a high speed, and an image signal of a high level can be obtained. In addition, a compact and inexpensive apparatus can be constituted.

According to still another aspect of the present invention, there is provided an image scanning apparatus having an imaging optical system for forming at least part of imaging light of an object into an image, an image sensor for performing photoelectric conversion of an optical image formed by the imaging optical system, and moving means for moving the optical image and the image sensor relative to each other, wherein the image sensor comprises photoelectric conversion portions for photoelectrically converting the optical image into an electrical signal, light-shielded transfer cells arranged alternately with the photoelectric conversion means, charge transfer means for transferring charges generated by the photoelectric conversion means, and charge adding means for adding the charges transferred by the charge transfer means, and the image scanning apparatus further comprises control means for performing control such that the charge transfer means transfers the charges substantially in synchronism with optical image movement by the moving means, and the charge adding means adds the charges from the plurality of different photoelectric conversion means in accordance with a transfer operation of the charge transfer means, and detection means for detecting relative movement of the optical image and the image sensor by the moving means, the control means performing relative control of optical image movement and charge transfer on the basis of an output from the detection means. With this arrangement, an accurate relationship is established between the moving means and the transfer means to obtain a more accurate image information signal.

According to still another aspect of the present invention, there is provided an image scanning apparatus having a light source for illuminating an object, an imaging optical system for forming at least part of imaging light of the object illuminated with the light source into an image, an image sensor for performing photoelectric conversion of an optical image formed by the imaging optical system, and moving means for moving the optical image and the image sensor relative to each other, wherein the light source sequentially emits light of different N colors, and the image sensor comprises a plurality of photoelectric conversion portions each constituted by a set of an array of photoelectric conversion means and (N−1) arrays of light-shielded transfer cells arranged adjacent to the photoelectric conversion means, charge transfer means for transferring charges generated by the photoelectric conversion means, and charge adding means for adding the charges transferred by the charge transfer means, and the image scanning apparatus further comprises control means for performing control such that the charge transfer means transfers the charges substantially in synchronism with optical image movement by the moving means, and the charge adding means adds the charges from different portions of the plurality of photoelectric conversion portions in accordance with a transfer operation of the charge transfer means. With this arrangement, for example, the filter is exchanged to form a light source which emits light of N colors time-sequentially. An original as an object is read as image data of N colors. By synchronizing the moving means with the charge transfer means, more accurate color image information can be obtained.

Other objects and features of the invention will be apparent from the following detailed description in conjunction with the accompanying drawings.

DESCRIPTION OF THE PREFERRED EMBODIMENTS

Various embodiments of the present invention and their functions will be described below in detail with reference to the accompanying drawings.

Figure 1:
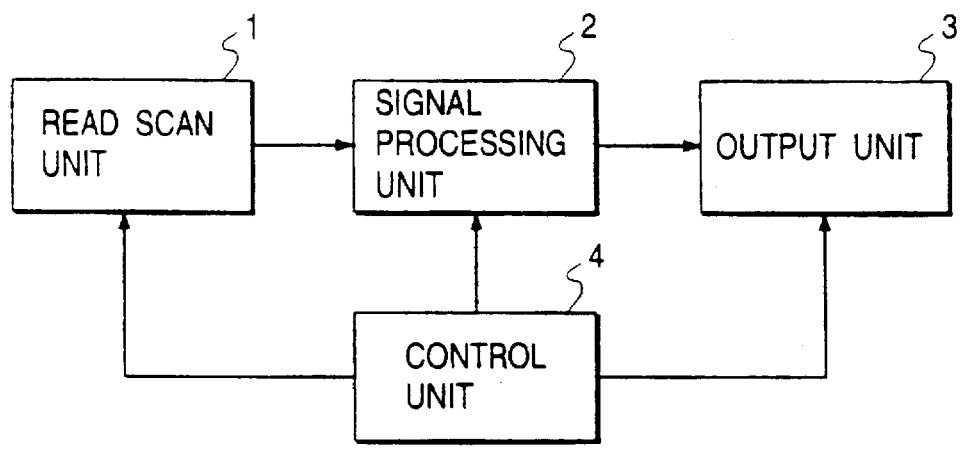
FIG. 1 is a block diagram of an image scanning apparatus according to the present invention.

FIG. 1 shows the basic arrangement of an image scanning apparatus. Referring to FIG. 1, an image signal output from a read scan unit 1 is subjected to predetermined processing by a signal processing unit 2 and output from an output unit 3. The respective units of the apparatus are controlled by a control unit 4.

Figure 2:
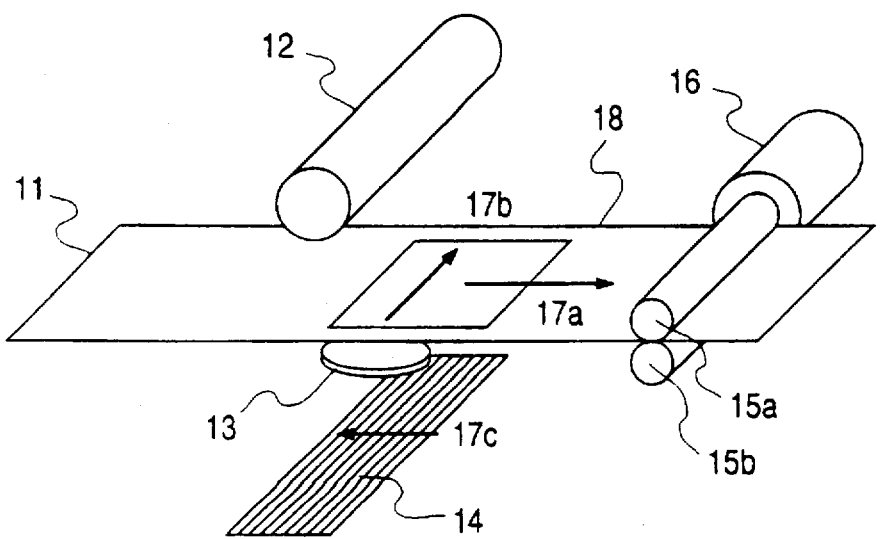
FIG. 2 is a perspective view showing the arrangement of an image scanning apparatus according to the present invention.

FIG. 2 is a perspective view showing the basic arrangement of an image scanning apparatus according to the first embodiment of the present invention, in which the image scanning apparatus is applied to a film scanner. Referring to FIG. 2, this film scanner scans the image of an exposed and developed film original 11. The size of one frame of the exposed film original corresponds to a rectangle 18. The transparent original 11 is illuminated with an illumination light source 12, and the image of the original 11 is formed on an image sensor 14 by an imaging lens 13 arranged on the opposite side of the original 11. As the light source 12, e.g., a white fluorescent lamp is used. Instead, external light may be introduced. The transparent original 11 is held between rollers 15a and 15b consisting of rubber or the like. The roller 15a is driven by a stepping motor 16. As a result, the film original 11 is fed along a direction indicated by an arrow 17a.

Figure 3A:
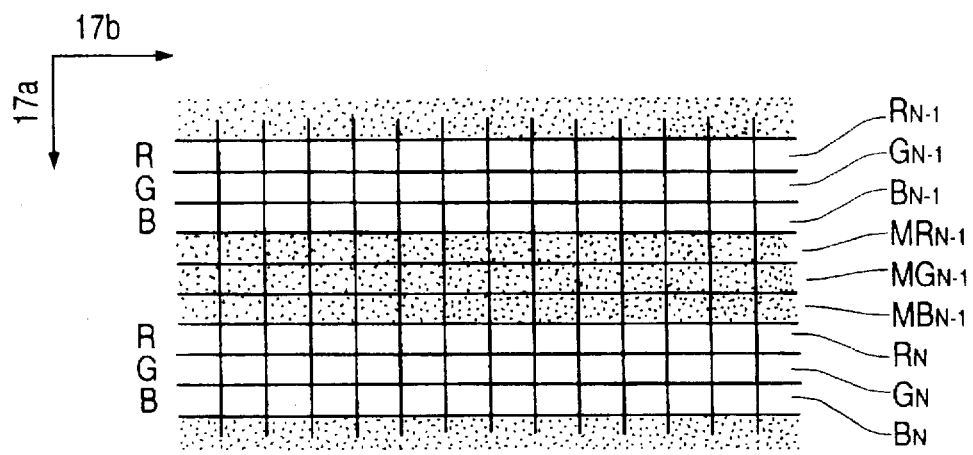
FIGS. 3A and 3B are views showing the detailed arrangement of the photoelectric conversion sensor of the image scanning apparatus according to the present invention shown in FIG. 1.
Figure 4A:
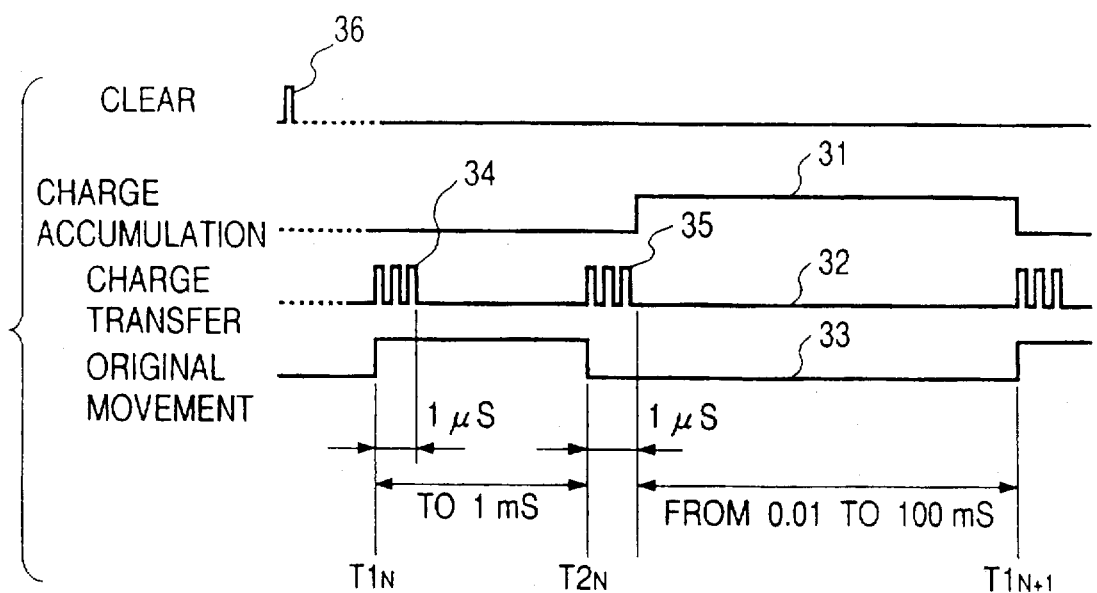
FIGS. 4A and 4B respectively show a scanning timing chart and an explanatory view of the operation of the image scanning apparatus according to the present invention shown in FIG. 1.

The image sensor 14 has an arrangement as shown in FIG. 3A. FIG. 4A is a timing chart of a driving pulse for the image sensor. The time length of each timing shown in FIG. 4A is only a reference value for helping to understand this embodiment and does not limit the present invention. The image sensor 14 of this embodiment is a CCD device having a structure called a frame transfer type (FT type). Arrows 17a and 17b indicating the directions of the original are also shown in FIG. 3A. The main scanning direction 17b for an electrical scanning operation is set along the widthwise direction of FIG. 3A. Transfer of photocharges is performed along the direction 17a perpendicular to the main scanning direction. As is well known, for the FT type CCD device 14, the effective aperture ratio of the sensor is improved by commonly using the photoelectric conversion portion in the charge transfer mode. More specifically, in the charge accumulation mode, signal charges corresponding to the amount of light incident on the respective pixels are generated, and the generated charges are accumulated in a depletion layer near the surface of the respective pixels. In the charge transfer mode, the potential near the surface is changed in accordance with external clocks, thereby simultaneously moving the charges to predetermined adjacent pixels. The detailed operation of the FT type CCD image sensor 14 is a known technique unnecessary for disclosure of the present invention, and a detailed description thereof will be omitted. The CCD 14 typically has 2,000 to 3,000 pixels along the direction indicated by the arrow 17b and several ten to several hundred arrays of photoelectric conversion pixels along the direction indicated by the arrow 17a. The number of pixels along the direction indicated by the arrow 17b, i.e., the main scanning direction, is a factor that determines the precision of the original read operation, and is therefore designed in accordance with the precision necessary for the scanning apparatus. For example, about 500 pixels suffice for image precision of the NTSC format. If the image is to be finally output to a medium such as a paper sheet in a large frame size for artistic appreciation, a high precision corresponding to 5,000 to 10,000 pixels may be required. The FT type CCD device 14 comprises a color sensor constituted by forming stripe-like color filters of primaries R, G, and B on the photoelectric conversion portion along the direction 17b. The respective saturated color filters of R, G, and B are arranged on three adjacent photoelectric areas. Opaque black filters are arranged on three arrays adjacent to the photoelectric areas. A total of six such arrays constitute a basic unit structure. The CCD 14 is constituted by repeatedly arranging the unit structures. In place of the opaque filters, a thin aluminum film or the like may be arranged. An optical low-pass filter (not shown in FIG. 2) is preferably inserted in the imaging system from the viewpoint of image quality. The color filters to be formed on the color sensor 14 need not always be of saturated colors of R, G, and B. Complementary color filters of C, M, and Y may also be used. Any set of color filters of independent colors having sufficient expression range in a color space can be used independently of the gist of the present invention because the colors can be converted into any color coordinate system by conversion and calculation.

The operation of this embodiment will be described below with reference to FIGS. 3A, 3B, 4A, and 4B. Before the scanning operation is started, a clear operation is performed by a clear pulse 36 to discharge unnecessary charges remaining in the CCD device 14. Depending on the structure of the CCD device 14, a technique of discharging the residual charges in the respective pixels through the closest drain or a technique of sweeping the charges by reading out all pixels at a high speed is used. The actual operation of the CCD device 14 often becomes so complex that the operation cannot be expressed as one pulse, though this technique is known, and a detailed description thereof will be omitted. Thereafter, photocharge accumulation for the image formed on the image sensor 14 and original movement are repeated. The Nth operation will be described. At time $T1_N$, photocharge accumulation at the immediately preceding original position is ended, and charge transfer and original movement are started.

Immediately before time $T1_N$, the image of a stripe-like area of the original along the direction 17b is formed on arrays $R_{N-1}$, $G_{N-1}$, and $B_{N-1}$ of the CCD sensor 14, and the image pattern is photoelectrically converted by these three line sensors. At time $T1_N$, an original movement pulse is supplied to the stepping motor 16, and the film original 11 is moved by one step by a power transferred to the roller 15a. The time required to move the original 11 by one step is about 1 ms between time $T1_N$ and time $T2_N$, though this time changes depending on the motor 16 or the driving mechanism 15. To retreat or save the photocharges to an opaque area immediately before original movement is started, the charges are transferred by a set of three charge transfer pulses 34. As a result, signal charges in the array $R_{N-1}$ are transferred to an array $MR_{N-1}$ (masked red array), signal charges in the array $G_{N-1}$ are transferred to an array $MG_{N-1}$, and signal charges in the array $B_{N-1}$ are transferred to an array $MB_{N-1}$. These arrays are masked such that images at different original positions are not received during original movement. Therefore, during original movement, photoelectric conversion of an image is substantially not performed.

Strictly speaking, charge transfer must be performed before the start of original movement. However, the time required to transfer charges of three arrays can be easily set at about 1 µs which is much shorter than the time required for original movement and negligible. Therefore, original movement and charge transfer can be simultaneously started. At time $T2_N$ when original movement is ended, charge transfer pulses 35 for three arrays are used again to transfer the signal charges to arrays $R_N$, $G_N$, and $B_N$. Upon completion of the transfer operation, a next effective photoelectric conversion period 31 starts. This photoelectric conversion operation continues up to time $T1_{N+1}$ for charge transfer to the next optical mask area, which is performed in synchronism with the next original movement step. The duration of this operation is 0.01 to 100 ms. The time required for photoelectric conversion (charge accumulation) largely changes depending on parameters including the density of the original, the intensity of the light source, and the F-number of the imaging system.

The original movement amount of one step is set such that the same image as that formed on the arrays $R_{N-1}$, $G_{N-1}$, and $B_{N-1}$ during the preceding photoelectric conversion period is formed on the arrays $R_N$, $G_N$, and $B_N$. More specifically, the original 11 and the signal charges move in synchronism with each other. The signal charges move corresponding to one point of the original until the signal charges generated in the first array are output from the last array of the CCD device 14. That is, photoelectric conversion for one point of the original is continued at different positions of the CCD device 14. In the first array of the CCD device 14, i.e., at the start point of charge transfer, signal charges accumulated so far are cleared to zero by a clear pulse. Since no charges are cleared between different photoelectric conversion periods, the charges sequentially add up and increase. The final output amount is proportional to the light amount of the original image. Since no circuit noise is generated in this process, unlike amplification using a circuit, the S/N ratio is largely improved.

One photoelectric conversion cycle for a color image can be performed per basic unit consisting of a total of six arrays of the CCD sensor 14. For example, for an image sensor with 60 arrays, ten photoelectric conversion cycles are performed, and signal charges of all photoelectric conversion portions illuminated at once are accumulated in ten arrays. That is, an effect equivalent to increasing the intensity of the light source to ten times or prolonging the photoelectric conversion period to ten times in the conventional image scanning apparatus having a line sensor structure can be obtained.

Figure 3B:
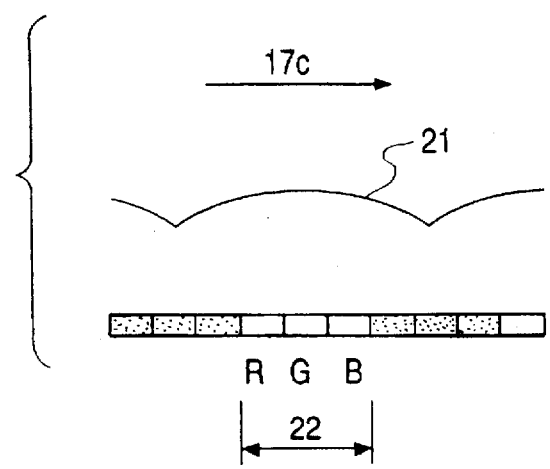

In this embodiment, the three sensor arrays $R_N$, $G_N$, and $B_N$ of one set correspond to slightly different positions separated by a distance corresponding to the pitch between the sensor arrays. This arrangement is sufficient for a normal scanner. However, to strictly eliminate color misregistration, the three color sensors must correspond to the same position of the image. FIG. 3B is a view showing a method that can be used for this purpose. In this method, the section of the sensor structure sliced along a direction indicated by an arrow 17c is shown. In this arrangement, a small cylindrical lens 21 is arranged just in front of the photosensitive surface of the sensor. The sensor surface is set to be substantially conjugate to the pupil of the imaging lens 13 in the direction indicated by the arrow 17c by the power of the cylindrical lens 21. On the other hand, the cylindrical lens 21 does not act along the main scanning direction 17b perpendicular to the sheet surface, so that the sensor surface is set to be conjugate to the surface of the original 11 by the imaging lens 13. With this arrangement, the sensor arrays R, G, and B correspond to the same position of the original.

The boundary between the small cylindrical lenses 21 is set at the center of mask portions $MR_N$, $MG_N$, and $MB_N$, and the diameter of the pupil of the imaging lens 13, which is formed on the sensor surface through the cylindrical lens 21, is set to be equal to a width 22 of the three arrays of R, G, and B. With this arrangement, ineffective light beams which are incident on adjacent mask portions without the cylindrical lens 21 can also be guided to the photosensitive portion, so that the loss of light can be reduced. The cylindrical lens 21 may have a lenslet structure which has a power along the main scanning direction 17b. In this case, the pitch of the lenslet must match the pixel pitch of the sensor along the direction 17b.

Figure 4B:
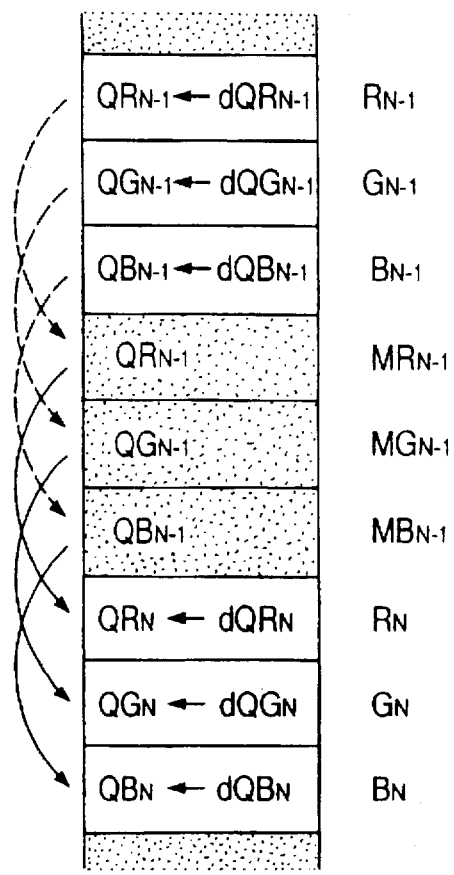

An operation associated with signal charge accumulation and transfer of this embodiment is microscopically illustrated in FIG. 4B. The same process is simultaneously performed for charge components of R, G, and B, and only the behavior of the red (R) component will be described below. Charges $QR_{N-1}$ of red, which have been accumulated until the (N-1)th operation, are instantaneously transferred from the pixel $R_{N-1}$ to a third pixel $MR_{N-1}$ ahead for retreat by the transfer pulse group 34. "Instantaneously" means that the amount of charges generated by photoelectric conversion during this time can be substantially neglected. Since the pixel $MR_{N-1}$ is light-shielded, the charges $QR_{N-1}$ are stored independently of original movement and instantaneously transferred to the third pixel $R_N$ ahead by the charge transfer pulse group 35. At this position, photoelectric conversion is performed during the period 31 to generate new charges $dQR_N$. The charges $dQR_N$ are added to the total amount of the charges $QR_{N-1}$ which have been repeatedly accumulated at the preceding position and become charges $QR_N$. For green and blue components, the same process is simultaneously performed.

In the FT type CCD device, all of charge transfer, photoelectric conversion, and charge accumulation are performed in a common cell defined by one potential well, so that the aperture utilization efficiency can be largely increased. The present invention can also be applied to an interline transfer CCD (IT type CCD), as a matter of course. When the image scanning apparatus of the present invention is constituted by an IT type CCD device, cells where photoelectric conversion is performed and cells where charge transfer and accumulation are performed are separated and arranged in different areas. This arrangement is disadvantageous for the aperture ratio. However, performance against smearing or blooming can be easily improved because of the device characteristics, so that this arrangement is usable depending on the performance required of the scanner. The present invention may be applied to an IT type CCD device, or a frame interline transfer (FIT) type CCD which is said to minimize smearing and improve the image quality.

Figure 5:
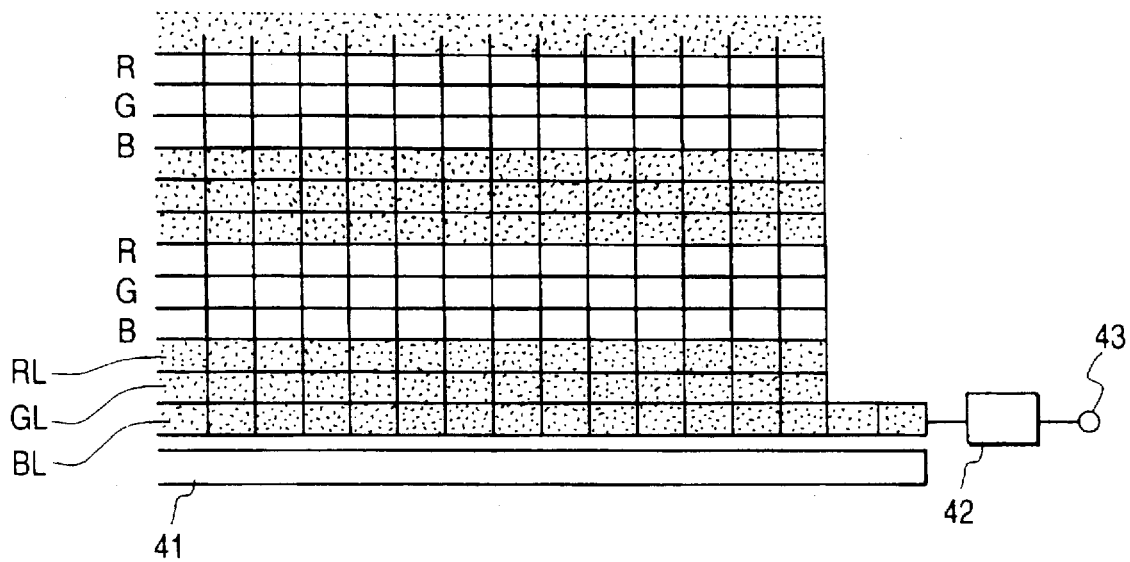
FIG. 5 is a view showing the arrangement of the output unit of the photoelectric conversion sensor of the image scanning apparatus according to the present invention shown in FIG. 1.

A horizontal register for sequentially reading out charges in units of pixels must be arranged at the rear portion of the basic unit structure. FIG. 5 is a view showing the output unit of the CCD device 14. Last three arrays RL, GL, and BL along the vertical transfer direction 17a are light-shielded. Like the remaining light-shielded portions, charges are transferred from the last R, G, and B photosensitive portions in synchronism with original movement. The three arrays RL, GL, and BL are designed such that the transfer operation can be performed independently of the vertical transfer operation of the remaining arrays. In addition, the last array BL can perform a horizontal transfer operation. In the timing chart of FIG. 4A, the signal charges added in units of arrays are transferred to the arrays RL, GL, and BL by the charge transfer pulse group 34 and sequentially output before time $T2_N$.

More specifically, charges of one array, which are present in the array BL, are sequentially transferred in the right direction under the control of a horizontal transfer register 41, converted into a voltage by a charge-to-voltage conversion element 42, and externally output through an output terminal 43. This voltage output is received by a digital system such as a computer through an A/D converter (not shown) in synchronism with clocks from the horizontal transfer register 41. Subsequently, by the independent vertical transfer function of the arrays RL, GL, and BL, the signal charges in the array GL are vertically transferred to the array BL, and the signal charges in the array RL are vertically transferred to the array GL. The charges in the array BL are sequentially horizontally transferred again. The signal charges in the array GL are vertically transferred to the array BL, and the charges in the array BL are sequentially horizontally transferred again. When all of the above operations are performed before time $T2_N$, all signal charges can be sequentially read out without influencing or delaying the charge accumulation operation.

In this embodiment, the number of arrays in the vertical direction can be an arbitrary multiple of six. A number obtained by dividing the number of arrays by six corresponds to the increase coefficient of the effective sensitivity. For example, assume that 2,000 pixels are arranged along the main scanning direction, and 240 arrays are arranged in the vertical direction. In this case, a scanner system having a sensitivity 40 times higher is obtained according to this embodiment. The total number of pixels of the sensor is 480,000 which is not largely different from that of a CCD device for a video camera of the NTSC format.

Figure 6:
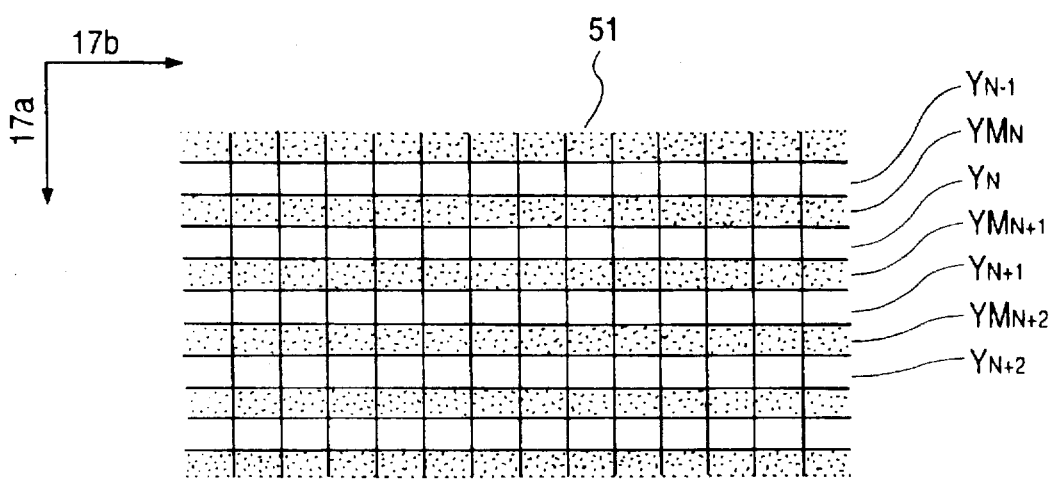
FIG. 6 is a view schematically showing another arrangement of the sensor of the image scanning apparatus according to the present invention shown in FIG. 1.

On the basis of the second embodiment, a monochrome scanner can be easily constituted. When a white light source is used, the optical and mechanical structures of a monochrome scanner are not so different from those of a color scanner as in FIG. 1. FIG. 6 is a view showing the sensor arrangement of a monochrome scanner constituted according to this embodiment. Referring to FIG. 6, in a sensor 51, transparent lines $Y_N$, $Y_{N-1}$, and the like having exposed photosensitive portions and lines $YM_N$, $YM_{N-1}$, and the like light-shielded by an aluminum layer or another light-shielding layer are alternately arranged. The lines having exposed photosensitive portions are arranged to receive the optical image of a scanned original. The light-shielded lines are arranged to avoid exposure during original movement. In this embodiment, R, G, and B line sensors having different spectral sensitivities need not correspond to the same position of the original, so the imaging power just in front of the sensor surface as shown in FIG. 3B is not always necessary. However, such an imaging element is preferably arranged to converge light beams incident on the light-shielded portions to the photosensitive portion to effectively improve the aperture ratio.

Figure 7:
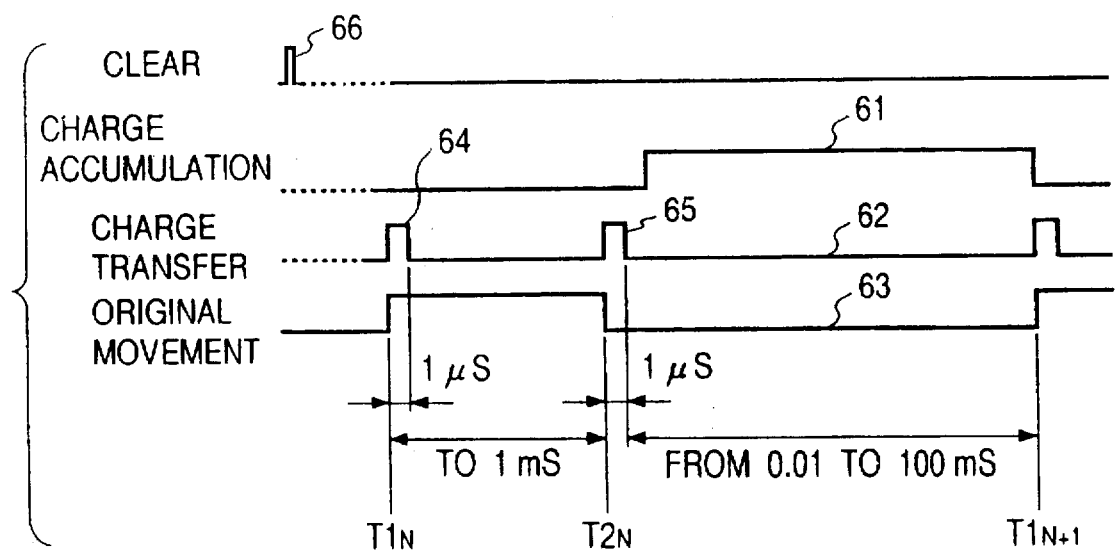
FIG. 7 is a timing chart for explaining the operation of the sensor according to the present invention shown in FIG. 5.

The operation of the monochrome scanner will be described below with reference to FIGS. 6 and 7. Before the scanning operation is started, a clear operation is performed by a clear pulse 66 to discharge unnecessary charges remaining in the CCD. Thereafter, accumulation of photocharges of an image formed on the image sensor and original movement are repeated. The Nth operation will be described below. At time $T1_N$, photocharge accumulation at the immediately preceding original position is ended, and charge transfer and original movement are started. Immediately before time $T1_N$, the image of a stripe-like area of the original along a direction 17b is formed on an array $Y_{N-1}$ of the CCD sensor, and the image pattern is photoelectrically converted by this line sensor. At time $T1_N$, an original movement pulse is supplied to a stepping motor 16, so that the film original is moved by one step by a power transferred to a roller 15a. To retreat photocharges to an opaque area immediately before original movement is started, the charges are transferred by a charge transfer pulse 64. As a result, signal charges in the array $Y_{N-1}$ are transferred to the array $YM_N$ which is masked such that images at different original positions are not received during original movement.

At time $T2_N$ when original movement is ended, the signal charges are transferred to the array $Y_N$ by using a charge transfer pulse 65. Upon completion of the transfer operation, a next effective photoelectric conversion period 61 starts. This photoelectric conversion operation continues up to time $T1_{N+1}$ for charge transfer to the next optical mask area, which is performed in synchronism with the start of the next original movement step. The duration of this operation is 0.01 to 100 ms. As in the embodiment of the color scanner, the original movement amount of one step is set such that the same image as that formed on the array $Y_{N-1}$ during the preceding photoelectric conversion period is formed on the array $Y_N$. More specifically, the original and the signal charges move in synchronism with each other. The signal charges move corresponding to one point of the original until the signal charges generated in the first array are output from the last array of the CCD. Photoelectric conversion for one point of the original is continued at different positions of the CCD, so that the signal charges add up at the respective positions and increase. One photoelectric conversion cycle can be performed per basic unit consisting of a total of two arrays. For example, for an image sensor with 20 arrays, ten photoelectric conversion cycles are performed, and all signal charges are added. That is, an effect equivalent to increasing the intensity of the light source to ten times or prolonging the photoelectric conversion period to ten times in a conventional image scanning apparatus having a monochrome line sensor structure can be obtained.

Figure 8:
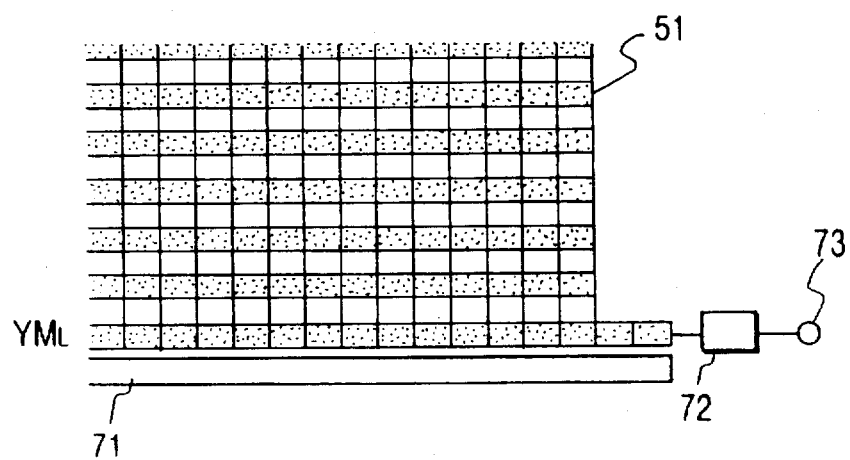
FIG. 8 is a view schematically showing the arrangement of the output stage of the sensor according to the present invention shown in FIG. 5.

As in the embodiment of the color scanner, a horizontal register for sequentially reading out charges in units of pixels is arranged at the last portion. FIG. 8 is a view showing the output unit of the CCD 51. A last array YML along a vertical transfer direction 17a is light-shielded. As in the remaining light-shielded portions, charges are transferred from the last photosensitive portion in synchronism with original movement. The last array YML can perform a horizontal transfer operation. In the timing chart of FIG. 7, the signal charges are transferred to the array YML by a charge transfer pulse 64 and sequentially output before time $T2_N$. More specifically, charges of one array, which are present in an array YL, are sequentially transferred in the right direction under the control of a horizontal transfer register 71, converted into a voltage by a charge-to-voltage conversion element 72, and externally output through an output terminal 73. This voltage output is received by a digital system such as a computer through an A/D converter (not shown) in synchronism with clocks from the horizontal transfer register 71. When all of the above operations are performed before time $T2_N$, all signal charges can be sequentially read out without influencing or delaying the charge accumulation operation.

In the above embodiment, signal charges are retreated to a light-shielded array during original movement and protected from exposure from a different original position. However, the original movement amount of one step is very small, and mixing of an image from the adjacent step to some extent does not always largely degrade the scanning accuracy. If exposure is allowed during original movement, generation and accumulation of signal charges are always performed as far as the corresponding portion of the original is present in the photosensitive portion of the sensor, resulting in highest effective sensitivity. On the basis of this finding, the third embodiment of the present invention will be described below.

Figure 9:
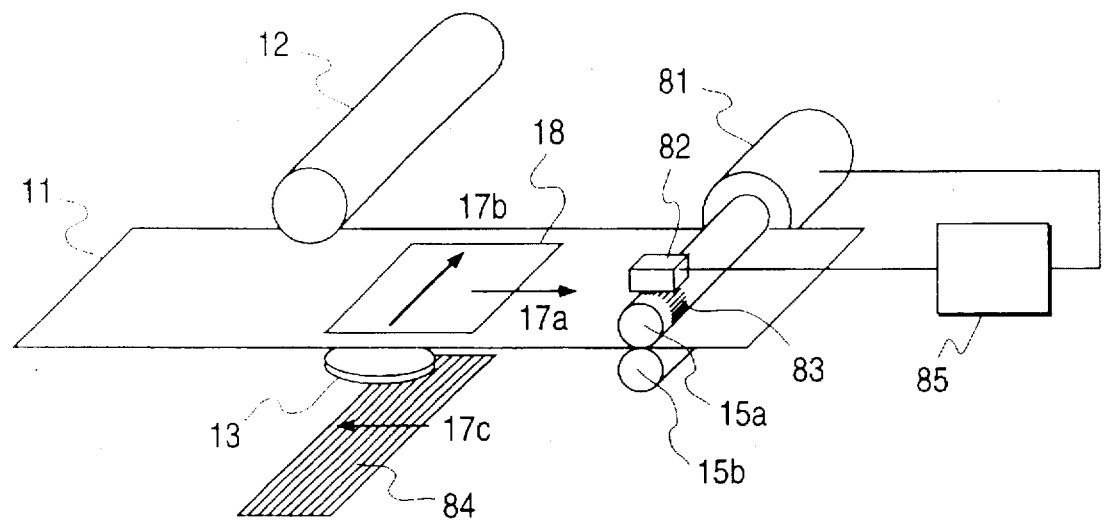
FIG. 9 is a perspective view showing another arrangement of the image scanning apparatus according to the present invention.

FIG. 9 is a perspective view showing the entire arrangement of a scanner according to this embodiment. This scanner differs from that shown in FIG. 2 in the original moving system constituted by a motor 81 and other members, and a sensor 84. The original moving system of this embodiment continuously or quasi-continuously performs original movement, so that it preferably has an encoder for monitoring the original moving velocity or the original position. The apparatus shown in FIG. 2 performs original feed control on the basis of a pulse input to the pulse motor 16 and therefore allows open-loop control. In the embodiment shown in FIG. 9, however, a more precise means for managing and controlling the original position is required to perform original movement and charge transfer in synchronism with each other. The motor 81 may be a pulse motor or another DC motor. The motor 81 is controlled to move an original at a constant velocity 11 through drive rolls 15a and 15b. There are a lot of known techniques for driving an object at a velocity as constant as possible while considering variations in mechanical load or the acceleration load immediately after the start. Normally, a technique is used in which the object position and the like are monitored and fed back to the driving source.

Figure 10:
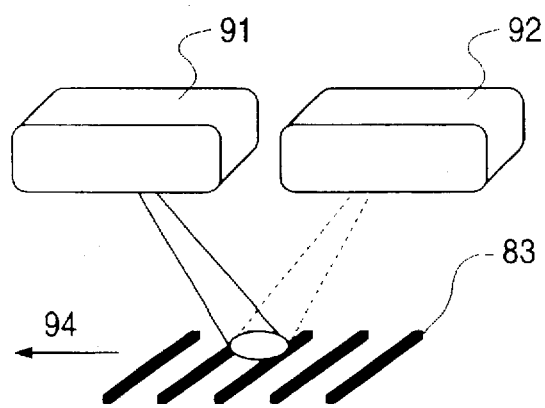
FIG. 10 is a perspective view showing the original moving amount detection member of the image scanning apparatus according to the present invention shown in FIG. 8.

In FIG. 9, bars 83 are arranged on the outer surface of the drive roll 15a at equal angular intervals. These bars are optically read by a read member 82 of the encoder, thereby detecting the velocity. FIG. 10 shows this portion in more detail. A light beam in a visible or infrared range is projected from a light-emitting source 91 in the read member 82 and formed into a spot on the bars 83. Light reflected from the projection area is detected by a light-receiving member 92. The amount of reflected light is small at the black portion of the bars. For this reason, the amount of reflected light received by the light-receiving member 92 is modulated in accordance with rotation of the roll in a direction indicated by an arrow 94. This modulated signal is analyzed by a circuit 85 and fed back to drive the motor 81 such that movement at a constant velocity is achieved. The arrangement shown in FIG. 10 is used to detect the velocity. When the pattern on the roll is formed of a gray code or the like, and a set of a plurality of sensors are used for the light-receiving member 92, the absolute position can be detected.

Figure 11A:
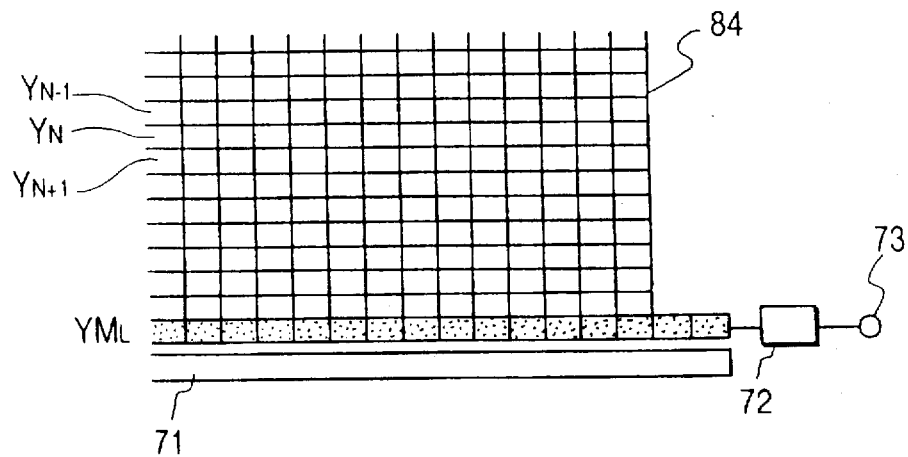
FIGS. 11A and 11B respectively show a view of the output unit of the photoelectric conversion sensor of the image scanning apparatus according to the present invention shown in FIG. 8 and a timing chart of the output unit.
Figure 11B:
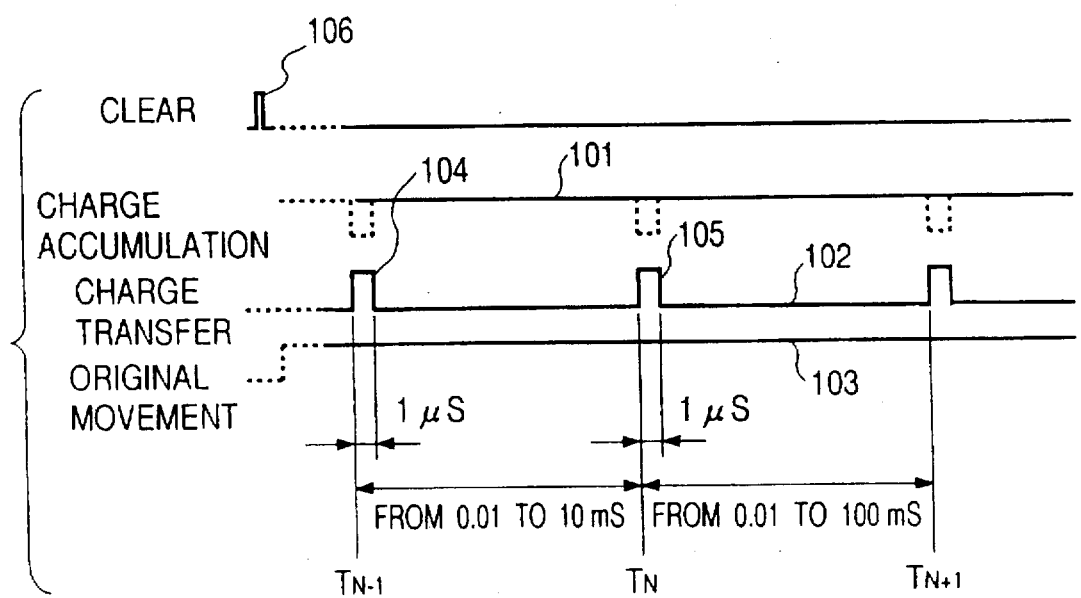

The sensor 84 of this embodiment has an arrangement as shown in FIG. 11A. The sensor 84 is constituted by a frame transfer CCD (FT type CCD) which is normally used as an image pickup device. FIG. 11B is a timing chart of a sensor driving operation. Signal charges are transferred to an adjacent array, i.e., from a line $Y_{N-1}$ to a line $Y_N$, and further to a line $Y_{N-1}$, by charge transfer clocks 104, 105, and the like. During this time, charge accumulation and original movement are always continuously performed as represented by control signals 101 and 103. The time required for charge transfer is short and substantially not associated with the operation. Strictly, however, with the arrangement of a normal frame transfer CCD, photoelectric conversion is continuously performed even at the instant of charge transfer.

A horizontal register for sequentially reading charges in units of pixels is arranged at a last array $YM_L$ in a light-shielded state. After the signal charges are transferred from the last array of the photosensitive portion to the array $YM_L$, the preceding signal charges transferred to the array $YM_L$ are sequentially output until the next signal charges are transferred from the last array of the photosensitive portion to the array $YM_L$. More specifically, the charges of one array, which are present in the array $YM_L$, are sequentially transferred in the right direction under the control of a horizontal transfer register 71, converted into a voltage by a charge-to-voltage conversion element 72, and externally output through an output terminal 73. This voltage output is received by a digital system such as a computer through an A/D converter (not shown) in synchronism with clocks from the horizontal transfer register 71.

According to this embodiment, the sensor arrangement is simplified, and the effective sensitivity of the system is increased. To obtain these advantages, mixing of an image from pixels of an adjacent array must be permitted to some extent. However, the aberration in imaging of the lens 13 is often worse. The technique of scanning an original image with a fixed line sensor while continuously moving the original is popular, and in this embodiment, the problem of the resolution precision is not beyond the problem of the prior art. In this embodiment, a direct timing relationship is not necessary between charge transfer between adjacent arrays of the sensor 84 and output pulses from the encoder 82. The encoder 82 basically serves as a monitor means for controlling original movement and originally operates independently of the timing of the CCD. In many cases, however, when charge transfer between adjacent arrays of the sensor 84 is controlled in synchronism with output pulses from the encoder 82 (e.g., every time the bar 83 is detected), this arrangement contributes to simplify the arrangement in designing the equipment.

A color scanner can be constituted on the basis of the idea of the fourth embodiment. When a color scanner is to be constituted with the arrangement shown in FIGS. 9, 11A, and 11B, at least two techniques are available. In the first technique, the light-shielded portions of the color sensor shown in FIGS. 3A, 3B, and 5 are removed on the basis of the same idea as for simplifying the monochrome scanner.

Figure 12:
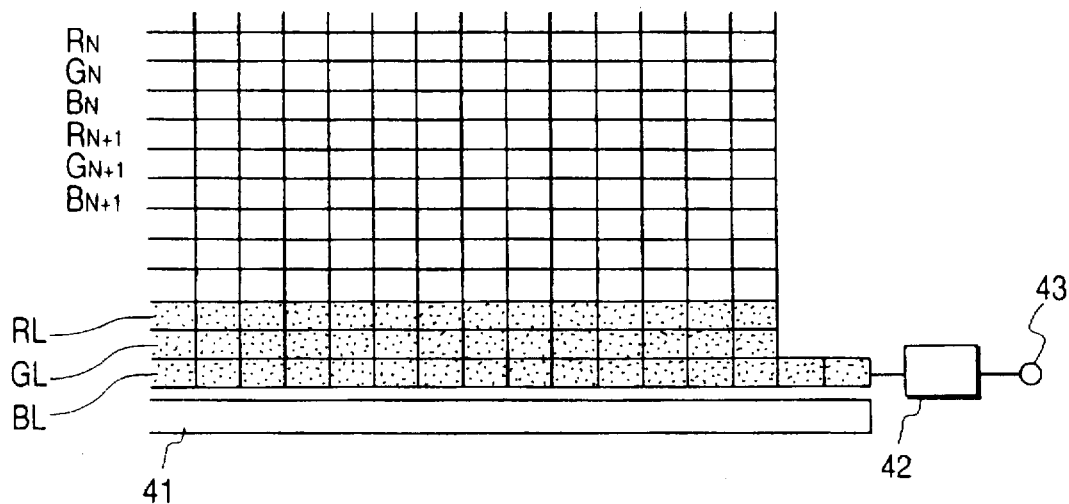
FIG. 12 is a view showing the arrangement of the output unit of another photoelectric conversion sensor of the image scanning apparatus according to the present invention shown in FIG. 8.

FIG. 12 shows the sensor arrangement. This sensor is constituted by repeatedly arranging arrays with R, G, and B stripe filters long in the horizontal direction. When the monochrome sensor 84 shown in FIG. 9 is replaced with a sensor 111, a color scanner arrangement is obtained. The chart of sensor driving pulses is similar to that shown in FIGS. 4A and 4B except that a process for retreating charges to the light-shielded portions during original movement is omitted. With this method, the R, G, and B line sensors correspond to original positions shifted by a line pitch, so that a defect in image such as a false color tends to occur. Therefore, an image quality improvement means is preferably added.

More specifically, as in the above-described embodiment, an imaging power just in front of the sensor surface, such as a cylindrical lens as shown in FIG. 3B or a lenslet, is preferably used. In this embodiment, however, no light-shielded portion is arranged for the purpose of retreating the charges to prevent mixing of an image during original movement, so it is difficult to position the cylindrical lens or the like with respect to the sensor. In FIG. 12, the boundary between adjacent cylindrical lenses must be superposed on the boundary between a line $B_N$ and a line $R_{N+1}$ with an accuracy higher than that of the pixel pitch. As an alternative means, an optical low-pass filter can be inserted in the optical path of the imaging system. An optical low-pass filter using the birefringence function of a quartz plate is well known because of its excellent cut-off characteristics. Alternatively, a filter having a grating structure using the diffraction phenomenon of light can be used.

Figure 13:
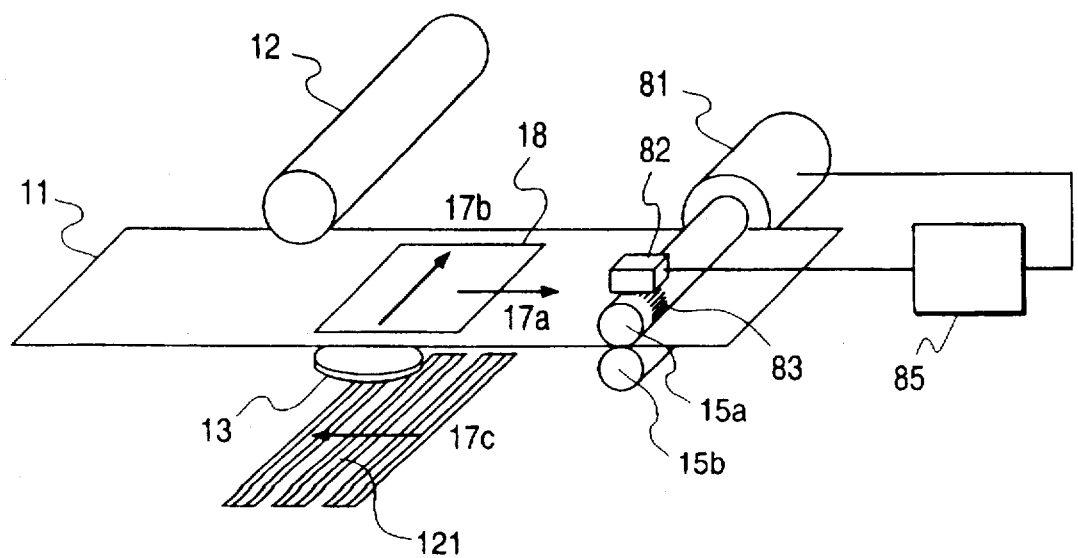
FIG. 13 is a perspective view showing another arrangement of the image scanning apparatus according to the present invention shown in FIG. 12.
Figure 14:
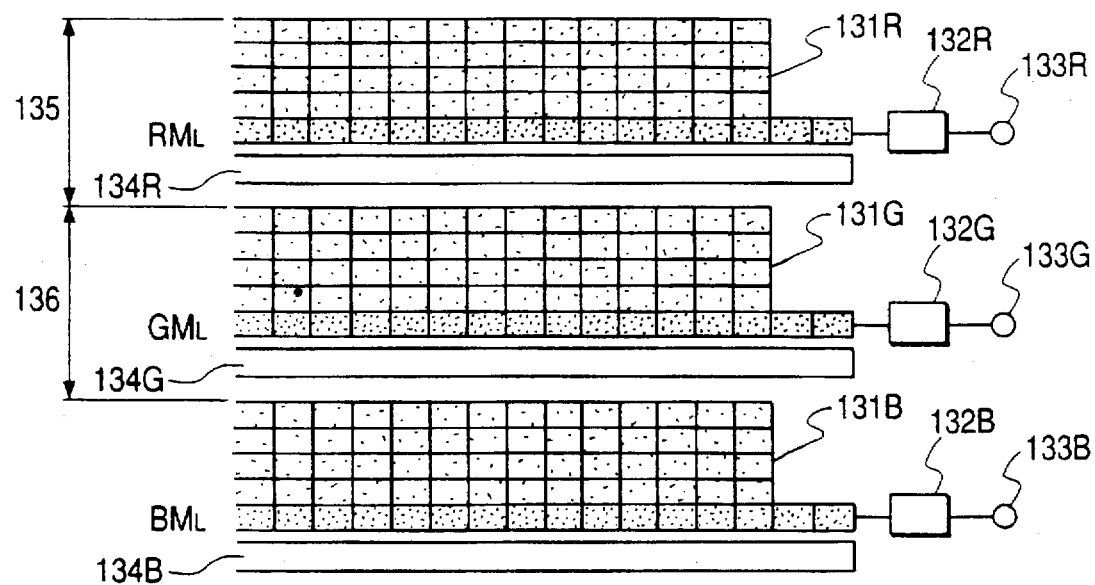
FIG. 14 is a view showing the arrangement of the photoelectric conversion sensor of the image scanning apparatus according to the present invention shown in FIG. 12.

In the second method of constituting a color scanner, a monochromatic filter is arranged on the entire monochromatic multiline sensor as shown in FIGS. 11A and 11B, and such systems of three colors are parallelly arranged. FIG. 13 is a perspective view showing the overall arrangement of the apparatus. This apparatus differs from the embodiment shown in FIG. 9 in a sensor 121. As in FIG. 14 showing the structure, the sensor 121 comprises three independent sensors 131R, 131G, and 131B each of which is constituted by arranging a monochromatic filter on the monochromatic sensor shown in FIGS. 11A and 11B. A red filter, a green filter, and a blue filter are arranged on the photosensitive portions of the sensors 131R, 131G, and 131B, respectively. The sensors 131R, 131G, and 131B include charge-to-voltage conversion means 132R, 132G, and 132B, output terminals 133R, 133G, and 133B, and shift registers 134R, 134G, and 134B, respectively.

For the illustrative and descriptive convenience, each sensor has a relatively small number of lines (five lines). The operation of each of these three sensors is the same as described in FIGS. 11A and 11B. Driving signals shown in FIG. 11B are applied to the three sensors in synchronism with each other. The respective sensors sequentially output image data through the output terminals 133R, 133G, and 133B. The subsequent digital system may receive these three outputs serially or parallelly from different input ports. Generally, with a parallel structure, a low-speed circuit suffices, though integration of memory management after A/D conversion tends to become complex. Anyway, the structure subsequent to the output terminals is a matter of design.

An important point of this embodiment is that the respective color sensors correspond to the original images at positions largely separated from each other, and a means is required for registering the positions of the three color images. Referring to FIG. 14, the sensor 131R and the sensor 131G are separated from each other at a pitch 135 along the direction of charge transfer (direction of original movement). Assuming that the period of generation of charge transfer pulses is $\Delta T$, the period $\Delta T$ corresponds to a time length in which signal charges transferred to a certain array are stopped until transfer to the next array and a photoelectric conversion operation is performed. During this period $\Delta T$, the original image is assumed to move by a distance $\Delta L$. In this case, the sampling position of the sensor 131R is ahead of that of the sensor 131G by steps corresponding to a number obtained by dividing the pitch 135 by the distance $\Delta L$ (the number of sampling operations is defined as a unit). Therefore, when M=(pitch 135)/$\Delta L$ is set to take an integer value, and a sampling data set for M step operations is formed, scanning data for different colors associated with the same position of the original image can be obtained. Considering a pitch 136, the data of the sensor 131B can be similarly treated.

Figure 23A:
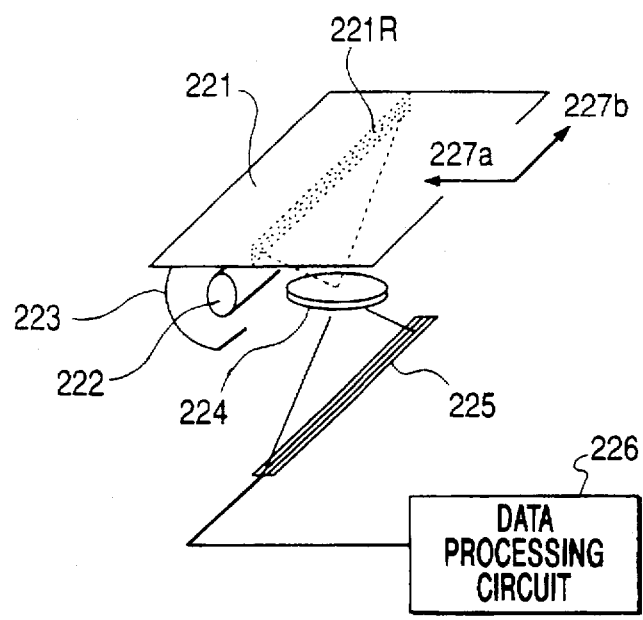
FIGS. 23A and 23B respectively show a perspective view of the main portion of a conventional image scanning apparatus and a view of the arrangement of the photoelectric conversion sensor.
Figure 23B:
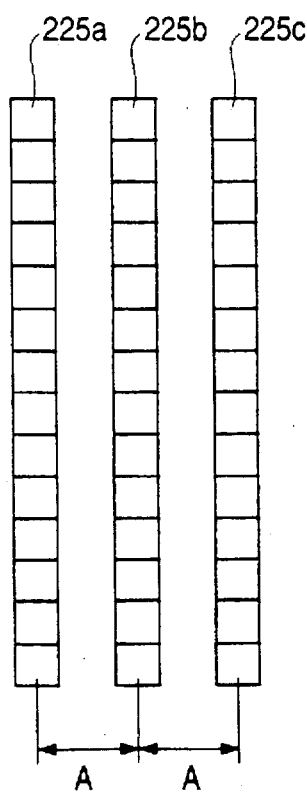

Generally, for a scanner with an arrangement in which the sampling positions for different colors are separated, and image data of three colors are synthesized using an electrical circuit after sampling, thereby obtaining integrated full-color image data, it is very important to match the position synthesis using the circuit with actual image movement. Any shift between actual movement of the image formed on the sensor surface and movement of an image which is assumed in design for circuit processing directly degrades the scanning resolution. The sensor pitches 135 and 136 of this embodiment are large because of the nature of the present invention. Depending on the arrangement, the pitch may correspond to several ten to several hundred lines. This sensor pitch is much larger than that of the conventional color scanner, i.e., the width A in FIG. 23B. The value A in the prior art corresponds to several lines of the sensor, and it is not so technically difficult to register or align image data of different colors obtained by the respective sensors.

The actual moving amount of the original image formed on the sensor surface is influenced by non-uniformity of the original moving velocity or variations in imaging magnification and cannot completely match an expected value. When actual original image movement is to match the electrical operation for a long range such as the pitch 135 or 136, a new scanner arrangement is required.

Figure 15:
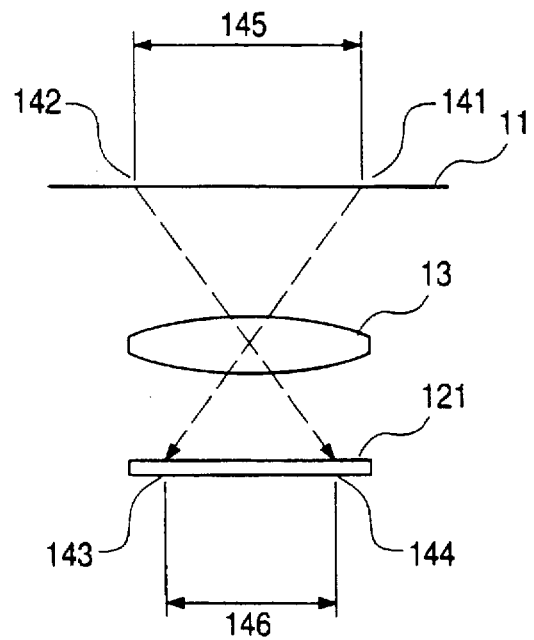
FIG. 15 is a view showing the arrangement of the optical system of the image scanning apparatus according to the present invention.
Figure 16:
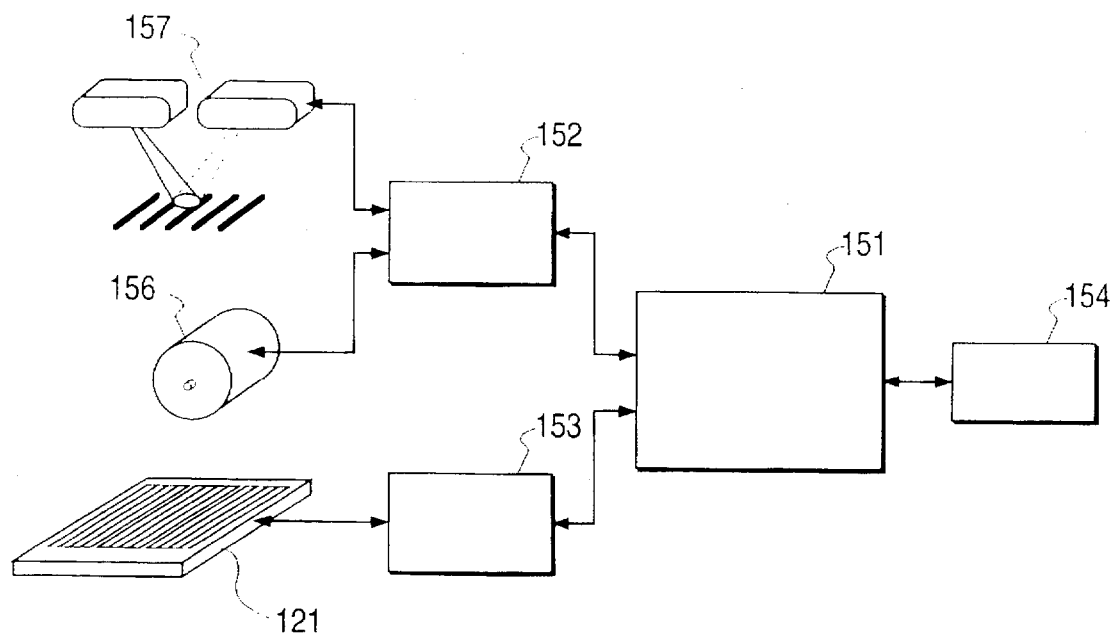
FIG. 16 is a block diagram showing electrical processing of original movement and the sensor of the image scanning apparatus according to the present invention.

FIGS. 15 and 16 show the sixth embodiment having such an arrangement. Referring to FIG. 15, the image of an original 11 is formed on the photosensitive surface of a sensor 121 by an imaging lens 13 and photoelectrically converted. FIG. 16 is a block diagram of an electrical system. This system comprises a main portion 151 of the system including a controller for controlling the entire system and a digital image processing unit, an original drive control circuit 152 for performing input/output and control of an encoder 157 and a motor 156, a sensor drive control circuit 153 associated with drive and input/output to the sensor 121, and a memory 154.

In FIG. 15, a test chart having a predetermined image pattern for adjustment is used as the original 11. An image scanning operation is performed while moving this original. The test pattern is assumed to have a thin white bar inserted on a black background. The white bar is located at a position 141 at a certain time, and the optical image of the white bar is formed and projected at a position 143 on the sensor. After a certain period of time has elapsed, the white bar comes to a position 142, and the optical image is at a position 144 on the sensor surface. An original moving amount 145 generated between the above two points of time can be measured on the basis of an output from the encoder 157.

A moving amount 146 of the optical image of the white bar on the sensor surface, which is generated between the two points of time, can be measured by analyzing the pattern of an image output from the sensor 121. The moving amount or the relative distance of a known relatively simple pattern can be measured by correlation analysis with a relatively high accuracy, and this technique is actually used in the fields of flow rate measurement, triangulation, navigation, and the like. The relationship between an output from the encoder of the original driving system and movement of the optical image of the original on the light-receiving surface of the sensor can be measured with this premeasurement process while considering variations generated in manufacturing, and the measurement result is stored in the memory 154. Once this relationship is determined, the amount of original movement synchronized with transfer of charges on the sensor by one line, which is necessary as a change in output from the encoder, is known. Therefore, the motor 156 can be appropriately driven and controlled to maintain desired movement. Conversely, the timing of driving pulses for the sensor may be changed in synchronism with the output from the encoder. Under such control, however, the accumulation time undesirably varies when movement at a non-uniform velocity occurs due to variations in load on the original driving system or acceleration/deceleration.

In this embodiment, a plurality of lines are also arranged in the sub-scanning direction of the image. The photoelectric conversion/accumulation operation is simultaneously performed in these lines, and variations in accumulation time are simultaneously generated in an equal amount for all the lines. Therefore, the variations in accumulation time do not directly cause a variation in image. Ideally, when the operation of the sensor is to be controlled on the basis of information of the original moving system to synchronize optical image movement with charge transfer, the sensor preferably has an arrangement in which the photosensitive portions and the light-shielded portions are alternately arranged because charge transfer and the accumulation time can be independently set. For a scanning operation with a high precision, sensors 131R, 131G, and 131B preferably have the arrangement shown in FIGS. 6 to 8. With these new arrangements, synchronization between optical image movement and charge transfer can be maintained for a very long range.

Figure 17:
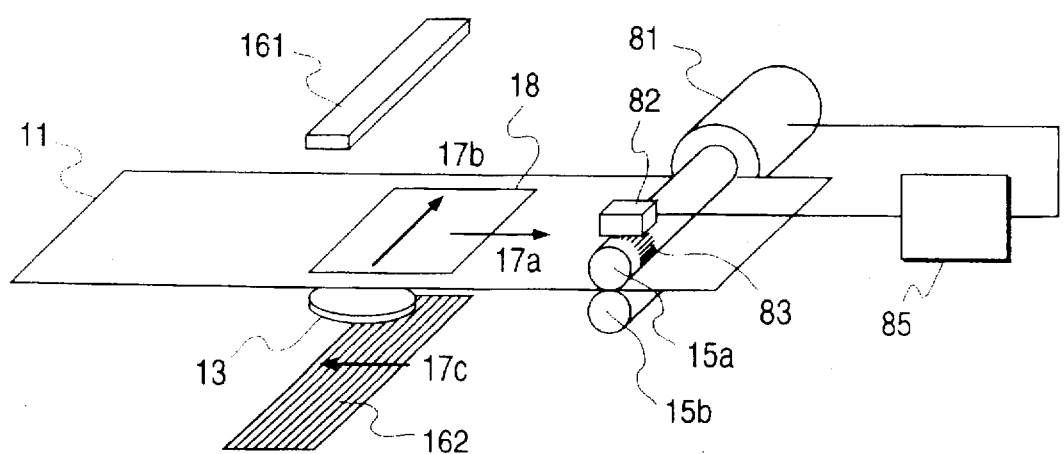
FIG. 17 is a perspective view showing another arrangement of the image scanning apparatus according to the present invention.
Figure 18:
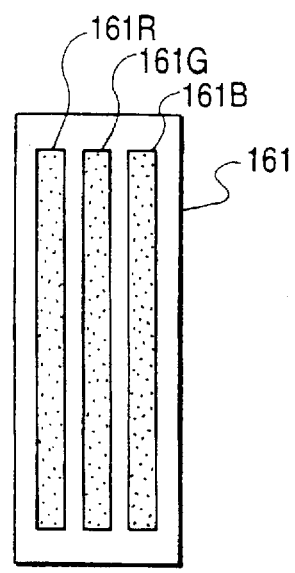
FIG. 18 is a view showing the arrangement of the light source of the image scanning apparatus according to the present invention shown in FIG. 16.

The seventh embodiment of the present invention will be described below. FIG. 17 is a perspective view showing the overall arrangement which is different from that shown in FIG. 9 in a light source 161 and a sensor 162. The light source 161 incorporates internal light sources of three different colors, as shown in FIG. 18. More specifically, the light source 161 has a red light source 161R, a green light source 161G, and a blue light source 161B. These internal light sources may comprise parallelly arranged three LED arrays of the respective colors or use a phenomenon such as EL. The light sources may be constituted by arranging color filters on a white light source. Alternatively, using one white light source, an optical filter whose transmission wavelength characteristics are switched between three modes by a mechanical means or another means may be inserted at an arbitrary position between the light source and the sensor.

In this embodiment, the three color light sources are sequentially caused to emit light to substantially obtain the effect of a color scanner with a monochromatic sensor without using any special filter for the sensor. The three internal light sources are arranged at different positions. Therefore, to illuminate substantially the same portion of an original 11 with light emitted from the internal light sources while preventing an illumination variation, special consideration is necessary for the illumination optical system.

Figure 19:
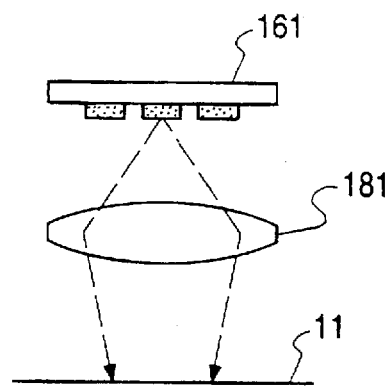
FIG. 19 is a view showing the arrangement of the optical system including the light source according to the present invention shown in FIG. 16.

FIG. 19 is a view showing an example wherein a condenser lens 181 is arranged between the light source 161 and the original 11. The condenser lens 181 forms light from the light source 161 into an image on the incident pupil of an imaging lens 13 (not shown). With this arrangement, wide light beams from the internal light sources of different colors are guided, as in Kohler illumination, so that one point on the original is uniformly illuminated with the three color light sources, and the illumination light can properly be incident on the pupil of the imaging lens 13.

Figure 20:
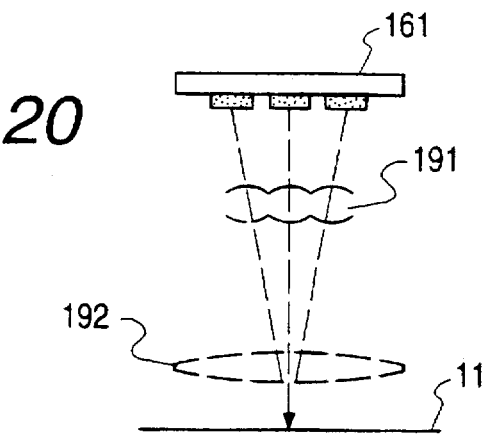
FIG. 20 is a view showing the arrangement of another optical system including the light source according to the present invention shown in FIG. 16.

FIG. 20 shows another illumination method. In FIG. 20, condenser lenses are independently arranged for the respective internal light sources. The light source images of the internal light sources are formed at the same position on the original 11 by a lens group 191. With such critical illumination, all illumination light beams can be condensed onto one point on the original, though incident of light on the pupil of the imaging lens 13 cannot be guaranteed. It is preferable to use a field lens 192 or the like such that the image of the lens group 191 is formed on the incident pupil of the imaging lens 13 (not shown). Vignetting in image formed on the incident pupil of the imaging lens 13 deteriorates the color balance of a scanning output, resulting in a large degradation in quality level of output data. This also applies to the illumination system shown in FIG. 19 and must be seriously considered in designing an apparatus having light sources of different colors.

Figure 21:
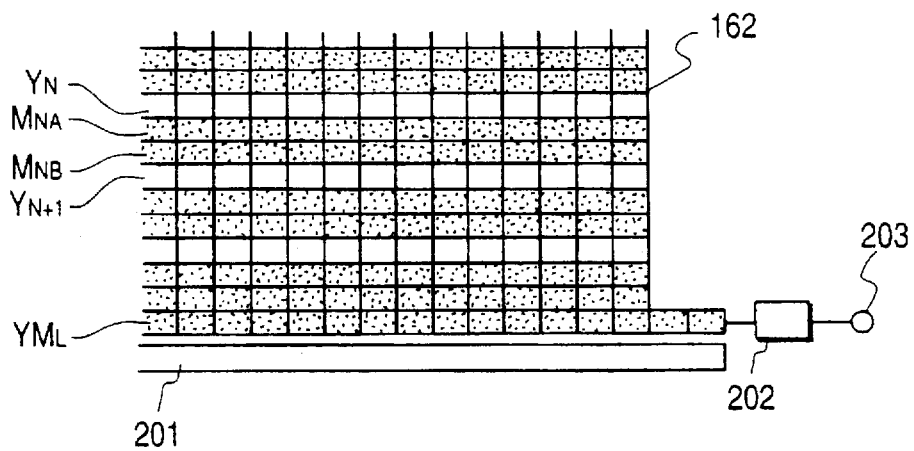
FIG. 21 is a view showing the arrangement of another photoelectric conversion sensor and output unit of the image scanning apparatus according to the present invention.
Figure 22:
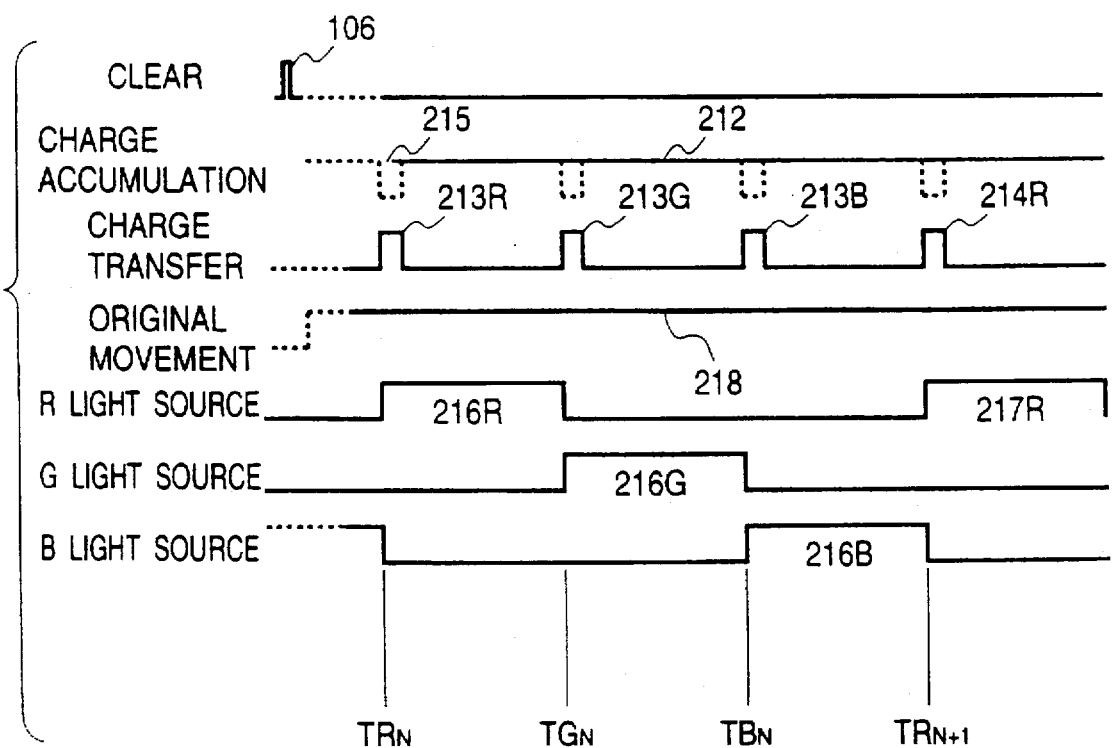
FIG. 22 is a timing chart for explaining the operation of the image scanning apparatus according to the present invention shown in FIG. 21.

FIGS. 21 and 22 show the arrangement of a sensor 162 used in the eighth embodiment, and the operation timing of the entire system including a light source 161, respectively. The sensor 162 is constituted by lines $Y_N$, $Y_{N-1}$, and the like exposed to incident light to perform photoelectric conversion and subsequent light-shielded portions $M_{NA}$ and $M_{NB}$ having a width corresponding to two lines. The basic structure consisting of three lines is repeatedly arranged. A last line $YM_L$ is a light-shielded horizontal register. With a vertical transfer operation, the line $YM_L$ receives signal charges from the immediately preceding line. With a horizontal transfer operation, the line $YM_L$ sends the signal charges to a charge-to-voltage conversion means 202 under the control of an adjacent shift register 201 before the next vertical transfer operation is performed. An image signal converted into a voltage appears at an output terminal 203 and is transmitted to an image processing circuit (not shown) (most typically, a digital signal processing circuit having an A/D converter as a digitizing means).

The operation sequence of this embodiment will be described below with reference to FIG. 22. As in the above-described embodiments, charges on the entire screen are cleared by a clear pulse 106 to empty the charge accumulation area. After the clear pulse is output, and before the substantial image scanning operation is started, an original moving signal 218 is turned on. After a steady original moving velocity is set, a charge accumulation operation for image scanning is started. Of repeated operations of accumulating charges, the Nth operation will be described below. At time $TR_N$ shown in the timing chart of FIG. 22, in other words, by a charge transfer pulse 213R generated at time $TR_N$, the preceding (N−1)th accumulation operation is ended, and the Nth accumulation operation is started. As the charge transfer pulse 213R, a short pulse of 1 μs or less normally suffices. In synchronism with this pulse, a light source driving signal 216R for causing a red light source 161R to emit light is turned on. A signal 212 representing a charge accumulated state is preferably turned off at the instant of charge transfer, like a pulse 215. However, this condition is not always essential because the period is much shorter than the effective accumulation time and negligible.

Since original image movement and charge transfer are in synchronism with each other, the original image which has been photoelectrically converted in a line $Y_{N-1}$ with the (N−1)th accumulation operation is photoelectrically converted in the line $Y_N$ with the Nth accumulation operation. After a predetermined accumulation time of, e.g., normally about 1 to 100 ms, has elapsed, photoelectric conversion of the red component is ended. At time $TG_N$, the operation shifts to an accumulation operation for a green component by a charge transfer pulse 213G. The charges of all pixels move line by line by the charge transfer pulse 213R, so that the charges accumulated under illumination of the red light source in the line $Y_N$ are transferred to the next light-shielded line $M_{NA}$. In addition, charges repeatedly accumulated under green illumination and present in a light-shielded line $M_{(N-1)B}$ immediately before the line $Y_N$ are transferred to the line $Y_N$. A light source driving signal 216G for causing a green light source 161G to emit light is turned on in synchronism with the charge transfer pulse 213G.

After a predetermined accumulation time has elapsed, photoelectric conversion for the green component is ended. At time $TB_N$, the operation shifts to an accumulation operation for a blue component by a charge transfer pulse 213B. The charges of all pixels move line by line by the charge transfer pulse 213B, so that the charges accumulated under illumination of the green light source in the line $Y_N$ are transferred to the next light-shielded line $M_{NA}$. Charges accumulated under red illumination and retreated to the line $M_{NA}$ so far are transferred to the next light-shielded line $M_{NB}$ for retreat. The charges repeatedly accumulated under blue illumination and present in the light-shielded line $M_{(N-1)B}$ immediately before the line $Y_N$ are transferred to the line $Y_N$. A light source driving signal 216B for causing a blue light source 161B to emit light is turned on in synchronism with the charge transfer pulse 213B. After the accumulation operation under blue illumination has been performed for a predetermined period of time, the operation shifts to the (N+1)th accumulation operation at time $TR_{N+1}$, so that the (N+1)th accumulation operation for the red component is started by a charge transfer pulse 214R. With this operation, the charge amount can be increased without mixing signal charges which are moved and repeatedly accumulated in synchronism with the original image under the time-sequential illumination of the respective light sources of R, G, and B.

In this embodiment, the scale of the sensor can be relatively made small. In addition, no on-chip filter which accounts for a large portion of the sensor cost is required. Furthermore, the accumulation time can be easily independently set for the respective colors of R, G, and B. Generally, when a semiconductor light source such as an LED is used, the light-emitting capability becomes poor as the light-emitting wavelength becomes short. As for presently available red and blue LEDs, when almost the same current is flowed, the light-emitting amount of the blue LED is smaller than that of the red LED by one to two orders of magnitude. In this embodiment, the accumulation time for each color can be freely changed with the timing of the charge transfer pulse $TR_N$, $TG_N$, or $TB_N$. Therefore, for example, the accumulation time for a blue component can be set to be an arbitrary multiple of that for a red component.

In this embodiment, original image movement for improving the color precision can be performed not continuously but step by step, as a matter of course. In this case, one set of accumulation operations for the three colors of R, G, and B are preferably performed at the same original position, and the original (image) is preferably moved by one step upon completion of one set of operations. When the original is to be moved, all signal charges are preferably retreated to the light-shielded portions not to be exposed. For such an operation, three lines of light-shielded portions are necessary in the basic unit structure to be repeated. According to the above embodiment, a color scanner which is free from color misregistration and whose sampling positions for the respective colors completely match each other can be realized by using a method of sequentially turning on the light sources.

The combination of the light source colors, the arrangement of the light source, the arrangement of the color filters, and the type of sensor in the above embodiment do not limit the present invention.

As has been described above, according to the present invention, new charges are sequentially generated and added while moving the signal charges in synchronism with optical image movement. With this arrangement, the image scanning apparatus can achieve both high precision and high-speed scanning properties which can hardly be achieved in the prior art. These technical challenges can be realized while maintaining and pursuing size and cost reductions of the apparatus.

In addition, a read signal of a high level can be output as a monochromatic or full-color image without generating noise which is conventionally generated by amplifying the output signal, resulting in an improvement in effective sensitivity in the read operation. Furthermore, when a color image is to be read, color misregistration can be reduced, thereby obtaining high-quality color image information.

What is claimed is:

1. An image scanning apparatus having an imaging optical system for forming at least part of imaging light of an object into an image, an image sensor for performing photoelectric conversion of an optical image formed by said imaging optical system, and moving means for moving the optical image and said image sensor relative to each other,
    wherein said image sensor comprises a plurality of photoelectric conversion means arranged adjacent to each other, charge transfer means for transferring charges generated by said plurality of photoelectric conversion means, and charge adding means for adding the charges transferred by said charge transfer means, and
    said image scanning apparatus further comprises control means for performing control such that said charge transfer means transfers the charges substantially in synchronism with optical image movement by said moving means, and said charge adding means adds the charges from said plurality of different photoelectric conversion means in accordance with a transfer operation of said charge transfer means.

2. An apparatus according to claim 1, wherein said plurality of photoelectric conversion means constituting said image sensor comprise first photoelectric conversion means having at least a first color filter on a photosensitive surface, and second photoelectric conversion means having a second color filter of a color different from that of said first color filter.

3. An apparatus according to claim 2, wherein said photoelectric conversion means comprise a plurality of first photoelectric conversion means and a plurality of second photoelectric conversion means, and said charge adding means adds charges generated by said plurality of first photoelectric conversion means and adds charges generated by said plurality of second photoelectric conversion means.

4. An apparatus according to claim 1, wherein said image sensor has a light-shielded transfer cell array along a direction perpendicular to a direction of charge transfer of said charge transfer means.

5. An apparatus according to claim 4, wherein said object is moved when signal charges accumulated in said image sensor are present in said light-shielded transfer cell array.

6. An apparatus according to claim 1, wherein a charge adding operation and a photoelectric conversion operation are performed in the same area of said image sensor.

7. An apparatus according to claim 1, further comprising detection means for detecting relative movement of the optical image and said image sensor by said moving means, and wherein said control means performs relative control of optical image movement and charge transfer on the basis of an output from said detection means.

8. An apparatus according to claim 1, further comprising imaging means arranged on a sensor surface of said image sensor and serving as a common refracting element for a plurality of pixels.

9. An apparatus according to claim 1, wherein said charge transfer means performs charge transfer operations a plurality of number of times within a short period of time in which photoelectric conversion of signal charges is substantially not performed.

10. An image scanning apparatus having an imaging optical system for forming at least part of imaging light of an object into an image, an image sensor for performing photoelectric conversion of an optical image formed by said imaging optical system, and moving means for moving the optical image and said image sensor relative to each other,
    wherein said image sensor comprises a plurality of photoelectric conversion portions each constituted by a set of a plurality of photoelectric conversion means having color filters of different colors and light-shielded transfer cells which are the same in number as said photoelectric conversion means and arranged alternately with said photoelectric conversion means, charge transfer means for transferring charges generated by said photoelectric conversion means, and charge adding means for adding the charges transferred by said charge transfer means, and
    said image scanning apparatus further comprises control means for performing control such that said charge transfer means transfers the charges substantially in synchronism with optical image movement by said moving means, and said charge adding means adds the charges from said plurality of different photoelectric conversion means in accordance with a transfer operation of said charge transfer means.

11. An apparatus according to claim 10, further comprising detection means for detecting relative movement of the optical image and said image sensor by said moving means, and wherein said control means performs relative control of optical image movement and charge transfer on the basis of an output from said detection means.

12. An apparatus according to claim 10, wherein said object is moved when signal charges accumulated in said image sensor are present in said light-shielded transfer cell array.

13. An apparatus according to claim 10, further comprising imaging means arranged on a sensor surface of said image sensor and serving as a common refracting element for a plurality of pixels.

14. An image scanning apparatus having an imaging optical system for forming at least part of imaging light of an object into an image, an image sensor for performing photoelectric conversion of an optical image formed by said imaging optical system, and moving means for moving the optical image and said image sensor relative to each other, wherein said image sensor comprises photoelectric conversion portions for photoelectrically converting the optical image into an electrical signal, light-shielded transfer cells arranged alternately with said photoelectric conversion means, charge transfer means for transferring charges generated by said photoelectric conversion means, and charge adding means for adding the charges transferred by said charge transfer means, and said image scanning apparatus further comprises control means for performing control such that said charge transfer means transfers the charges substantially in synchronism with optical image movement by said moving means, and said charge adding means adds the charges from said plurality of different photoelectric conversion means in accordance with a transfer operation of said charge transfer means, and detection means for detecting relative movement of the optical image and said image sensor by said moving means, said control means performing relative control of optical image movement and charge transfer on the basis of an output from said detection means.

15. An apparatus according to claim 14, wherein said object is moved when signal charges accumulated in said image sensor are present in said light-shielded transfer cell.

16. An apparatus according to claim 14, further comprising imaging means arranged on a sensor surface of said image sensor and serving as a common refracting element for a plurality of pixels.

17. An image scanning apparatus having a light source for illuminating an object, an imaging optical system for forming at least part of imaging light of said object illuminated with said light source into an image, an image sensor for performing photoelectric conversion of an optical image formed by said imaging optical system, and moving means for moving the optical image and said image sensor relative to each other, wherein said light source sequentially emits light of different N colors, and said image sensor comprises a plurality of photoelectric conversion portions each constituted by a set of an array of photoelectric conversion means and (N–1) arrays of light-shielded transfer cells arranged adjacent to said photoelectric conversion means, charge transfer means for transferring charges generated by said photoelectric conversion means, and charge adding means for adding the charges transferred by said charge transfer means, and said image scanning apparatus further comprises control means for performing control such that said charge transfer means transfers the charges substantially in synchronism with optical image movement by said moving means, and said charge adding means adds the charges from different portions of said plurality of photoelectric conversion portions in accordance with a transfer operation of said charge transfer means.

18. An apparatus according to claim 17, further comprising detection means for detecting relative movement of the optical image and said image sensor by said moving means, and wherein said control means performs relative control of optical image movement and charge transfer on the basis of an output from said detection means.

19. An apparatus according to claim 17, further comprising imaging means arranged on a sensor surface of said image sensor and serving as a common refracting element for a plurality of pixels.

* * * * *

UNITED STATES PATENT AND TRADEMARK OFFICE
CERTIFICATE OF CORRECTION

PATENT NO. : 5,750,985
DATED : May 12, 1998
INVENTOR(S) : KENJI SUZUKI

It is certified that error appears in the above-identified patent and that said Letters Patent is hereby corrected as shown below:

<u>COLUMN 8</u>

Line 10, "$T1_N$and" should read --$T1_N$ and--.

<u>COLUMN 10</u>

Line 67, "$Y_{N-1}$," should read --$Y_{N+1}$,--.

<u>COLUMN 11</u>

Line 1, "$YM_{N-1}$," should read --$YM_{N+1}$,--.

<u>COLUMN 13</u>

Line 16, "$Y_{N-1}$," should read --$Y_{N+1}$,--.

<u>COLUMN 17</u>

Line 29, "$Y_{N-1}$," should read --$Y_{N+1}$,--.

Signed and Sealed this

Twenty-second Day of December, 1998

Attest:

BRUCE LEHMAN

*Attesting Officer*    *Commissioner of Patents and Trademarks*